US010461898B2

(12) United States Patent
Kurian

(10) Patent No.: US 10,461,898 B2
(45) Date of Patent: Oct. 29, 2019

(54) PARALLEL DATA TRANSMISSION

(71) Applicant: Bank of America Corporation, Charlotte, NC (US)

(72) Inventor: Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 15/617,463

(22) Filed: Jun. 8, 2017

(65) Prior Publication Data

US 2018/0359059 A1 Dec. 13, 2018

(51) Int. Cl.
*H04L 1/22* (2006.01)
*H04L 1/00* (2006.01)
*H04L 29/06* (2006.01)
*H04L 1/08* (2006.01)

(52) U.S. Cl.
CPC .............. *H04L 1/22* (2013.01); *H04L 1/0006* (2013.01); *H04L 1/08* (2013.01); *H04L 63/0227* (2013.01); *H04L 63/1483* (2013.01); *H04L 2001/0096* (2013.01)

(58) Field of Classification Search
CPC ....... H04L 1/22; H04L 1/0006; H04L 63/166; H04L 1/08; H04L 63/0227; H04L 63/1483

See application file for complete search history.

(56) References Cited

U.S. PATENT DOCUMENTS

| | | |
|---|---|---|
| 8,285,681 B2 | 10/2012 | Prahlad et al. |
| 8,527,549 B2 | 9/2013 | Cidon |
| 8,762,642 B2 | 6/2014 | Bates et al. |
| 8,788,628 B1 | 7/2014 | Taylor et al. |
| 8,805,951 B1 | 8/2014 | Faibish et al. |
| 8,805,968 B2 | 8/2014 | Taylor et al. |
| 8,832,820 B2 | 9/2014 | Barjatiya et al. |
| 8,850,130 B1 | 9/2014 | Aron et al. |
| 9,147,195 B2 | 9/2015 | Sivaramakrishnan et al. |
| 9,256,374 B1 | 2/2016 | Aron et al. |
| 9,264,499 B2 | 2/2016 | Li et al. |
| 9,348,840 B2 | 5/2016 | Sedayao et al. |

(Continued)

OTHER PUBLICATIONS

M. J. Kurian, Serial Data Transmission Patent Application, Jun. 8, 2017.

*Primary Examiner* — Benjamin H Elliott, IV
*Assistant Examiner* — Brian P Cox
(74) *Attorney, Agent, or Firm* — Michael A. Springs

(57) ABSTRACT

An example embodiment includes a first, second, and third subsystem, each in different locations, where the first subsystem receives a request to deliver data to the third subsystem, sends a first subset of the data to the second subsystem, and sends, through first nodes, a first data stream containing a second subset of the data different from the first subset to the third subsystem. The second subsystem receives the first subset from the first subsystem, and sends, through second nodes that differ from the first nodes, a second data stream containing the first subset to the third subsystem. Furthermore, the third subsystem receives the first and second data streams, determines that the first and second data streams, in combination, contain the data, builds a data set containing the data based on the first and second data streams, and sends the data set to a downstream component of the third subsystem.

18 Claims, 7 Drawing Sheets

(56) References Cited

U.S. PATENT DOCUMENTS

| | | | |
|---|---|---|---|
| 9,398,087 B1 | 7/2016 | Hosie et al. | |
| 9,419,796 B2 | 8/2016 | König | |
| 9,424,437 B1 | 8/2016 | Ancin et al. | |
| 9,454,398 B2 | 9/2016 | Hacker | |
| 9,529,683 B2 | 12/2016 | Wu et al. | |
| 9,565,200 B2 | 2/2017 | Bacastow et al. | |
| 2008/0045212 A1* | 2/2008 | Kim | H04W 28/18 455/435.1 |
| 2014/0040364 A1* | 2/2014 | Baldwin | H04L 65/605 709/204 |
| 2016/0277473 A1* | 9/2016 | Botsford | H04L 65/608 |
| 2017/0039218 A1 | 2/2017 | Prahlad et al. | |
| 2017/0278546 A1* | 9/2017 | Xiao | G11B 27/031 |
| 2018/0157868 A1* | 6/2018 | Karivaradaswamy | G06F 13/1673 |

* cited by examiner

PARALLEL DATA TRANSMISSION

TECHNICAL FIELD

The present disclosure relates generally to data transmission across networks.

BACKGROUND

Transmitting data across one or more networks from a source to a destination often involves the data hopping to and from one or more network nodes on its way toward the destination. The data sent in such transmissions is sometimes vulnerable to improper acquisition or other attacks, such as "man-in-the middle" attacks. In addition, the data sent in such transmissions can be vulnerable to network instabilities, overloaded nodes, or other situations that cause some or all of the data to be dropped, lost, or corrupted during its transmission from the source to the destination.

SUMMARY OF EXAMPLE EMBODIMENTS

In an embodiment of the present disclosure, a system includes a first subsystem located in a first location, a second subsystem located in a second location, and a third subsystem located in a third location, wherein the first, second, and third locations correspond to different geographical locations, and wherein the first subsystem includes a first analytics engine and a first delivery engine, the first analytics engine configured to receive a request to deliver data to the third subsystem, the data including a plurality of packets, and inform the first delivery engine of the request. Furthermore, the first delivery engine is configured to send a first subset of the plurality of packets to the second subsystem, and send, through a first combination of nodes, a first data stream to the third subsystem, the first data stream including a second subset of the plurality of packets, wherein the second subset of the plurality of packets is different from the first subset of the plurality of packets. In addition, the second subsystem includes a second analytics engine and a second delivery engine, the second analytics engine configured to receive the first subset of the plurality of packets from the first subsystem, and inform the second delivery engine to deliver the first subset of the plurality of packets to the third subsystem. Furthermore, the second delivery engine is configured to send, through a second combination of nodes that differ from the first combination of nodes, a second data stream to the third subsystem, the second data stream including the first subset of the plurality of packets. The third subsystem includes a data stream processor, the data stream processor configured to receive the first and second data streams, determine that the first and second data streams, in combination, include each of the plurality of packets, build a data set based on the first and second data streams, wherein the data set include the plurality of packets, and send the data set to a downstream component of the third subsystem.

In another embodiment of the present disclosure, a front-end system includes a data receiving engine configured to receive, from a first subsystem, a first data stream sent to a third subsystem, wherein the first data stream includes a first subset of data including a plurality of packets, receive, from a second subsystem that is in a different geographical location than the first subsystem, a second data stream sent to the third subsystem, wherein the second data stream includes a second subset of the data, wherein the second subset of the data is different from the first subset of the data, and send the first and second data streams to a data stream processor. The front-end system also includes the data stream processor, which is configured to receive the first and second data streams, determine that the first and second data streams, in combination, includes each of the plurality of packets, build a data set based on the first and second data streams, wherein the data set includes the plurality of packets, and send the data set to a downstream component of the third subsystem.

In accordance with the present disclosure, disadvantages and problems associated with data transmission across networks may be reduced or eliminated. For example, when data, especially large data load, are sent from one source location to a destination location (e.g., from a server in Texas to a server in New York), nodes along the data transmission path between Texas to New York may have failures such that the data does not reach New York intact. In addition, nodes along the data transmission path may have security vulnerabilities that make the data being sent susceptible to improper acquisition or tampering (e.g., with a virus or malware).

Certain embodiments of the present invention send data in a serial manner, such that the data load is sent twice, once from Texas to New York and once from a second source location, California, to New York, for example. Thus, the likelihood that the data will reach the New York server intact is higher than if only one copy of the data was sent. In certain embodiments, the Texas server may send the second copy to the California server, such that the California server does not have to maintain copies of data being sent in a serial manner. In certain embodiments, a serial delivery method may increase the reliability of sending information, such as cloud computing objects and large data loads, to different locations, particularly when the importance of receiving such objects is high or the transmission time his high such that the time it takes to send a single copy, receive it, check it for completeness, notify the sender that the copy is incomplete or corrupted, and then send a second copy is unacceptably long.

In addition, certain embodiments of the present invention send data in a parallel manner, such that two or more data transmissions originating from different locations and taking different paths to the destination each contain different subsets of a data load. Thus, in some embodiments, data loads can be transmitted such that if a particular node intercepts one of the data transmissions, that node does not receive the full data transmission and potentially cannot (or cannot effectively) use the intercepted information. In addition, in some embodiments, a parallel data delivery system may send data faster to a destination, because different sources can send portions of a large data load at the same time to a destination.

Moreover, in some embodiments the data load can be split according to a certain set of rules and rebuilt according to another set of rules, such that the data can be encrypted via separation or through other means and effectively reassembled once received by the proper destination.

Embodiments of the present disclosure provide technological solutions to technological problems, e.g., by creating better ways to transfer data (e.g., large data and cloud objects) across networks to increase transfer speed, reliability, data security, etc. In certain embodiments, some benefits of the present disclosure are realized to a greater degree as the size of particular data loads increase, such that relatively larger data loads may experience pronounced benefits compared to relatively smaller data loads in some embodiments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE EXAMPLE DRAWINGS

For a more complete understanding of the present disclosure and for further features and advantages thereof, reference is now made to the following description taken in conjunction with the accompanying example drawings, in which.

DETAILED DESCRIPTION

Transmitting data across one or more networks from a source to a destination often involves the data hopping to and from one or more network nodes on its way toward the destination. The data sent in such transmissions is sometimes vulnerable to improper acquisition or other attacks, such as "man-in-the middle" attacks. In addition, the data sent in such transmissions can be vulnerable to network instabilities, overloaded nodes, or other situations that cause some or all of the data to be dropped, lost, or corrupted during its transmission from the source to the destination.

Certain embodiments of the present disclosure allow for the in-series sending of multiple copies of large data loads from multiple locations taking different paths to their destination, which in some embodiments increases the reliability of transmission such that a faulty node that affects one copy of the data does not affect the other copy because it may not travel through that node.

Certain embodiments of the present disclosure also allow for the in-parallel sending of a large data load by splitting the data load into different subsets of data that are each sent from a different location along a different path. Such embodiments may increase the security of data transmissions, because the interception of any one subset will not give the interceptor the entire data load. Depending on how the data load is split, a subset may not be useful, or even readable by reasonable means before it is rebuilt into the data load, which may be difficult or impossible without the other subsets that make up the data load. In addition, parallel-style data transmissions may increase the speed at which data is sent, because multiple subset of a large data load can be sent at the same time using different network paths.

In addition, cloud computing objects and resources may benefit from embodiments of this disclosure, as they are often not transmitted to new locations more local to activity related to them due to security and transmission time concerns. Thus, certain embodiments of this disclosure may improve the operation of cloud computing systems, by enabling a more efficient means to distribute cloud resource and other cloud objects.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Figure 1:
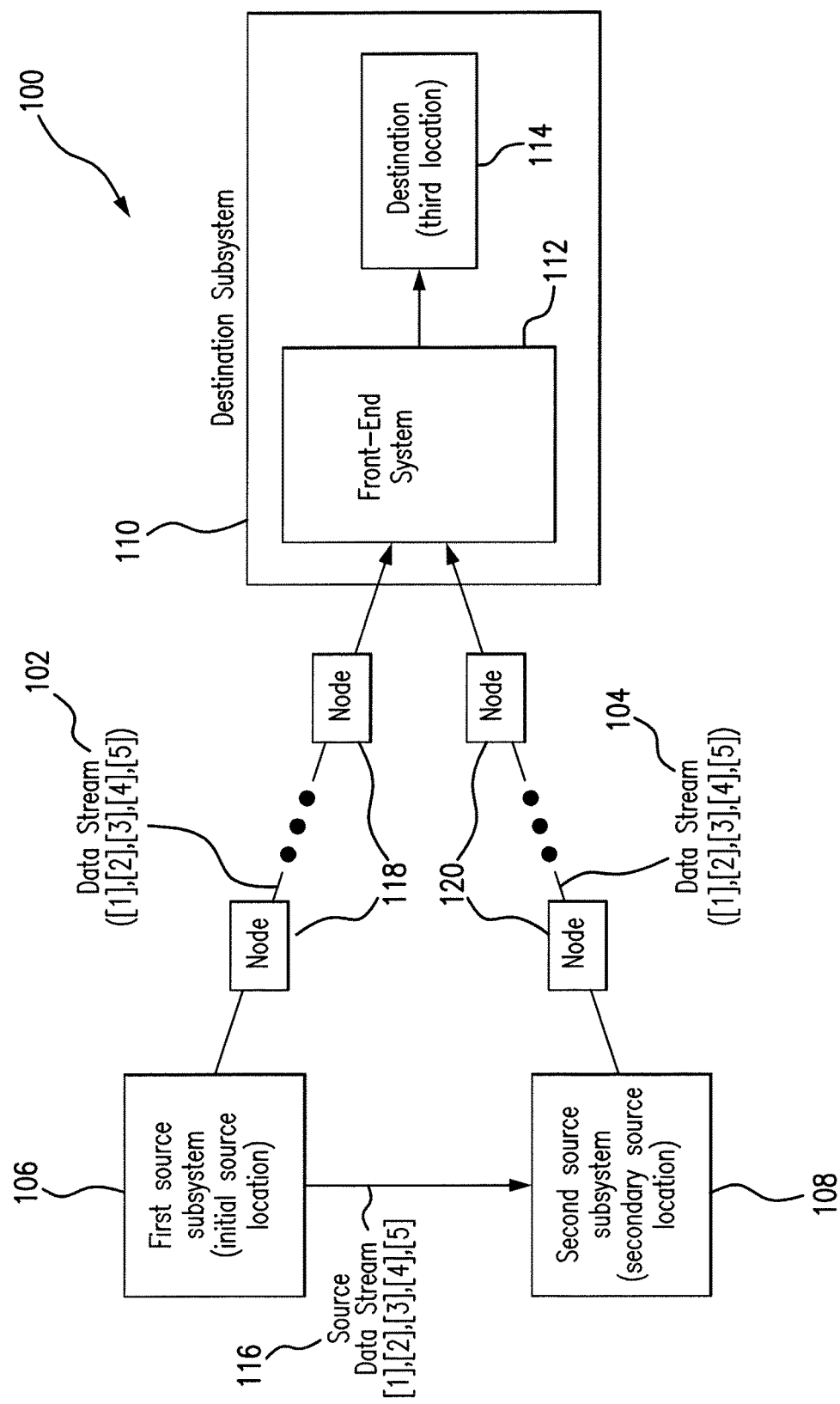
FIG. 1 illustrates an overview of an example data transmission system operating to send data in series, according to an example embodiment of the present disclosure.
Figure 2:
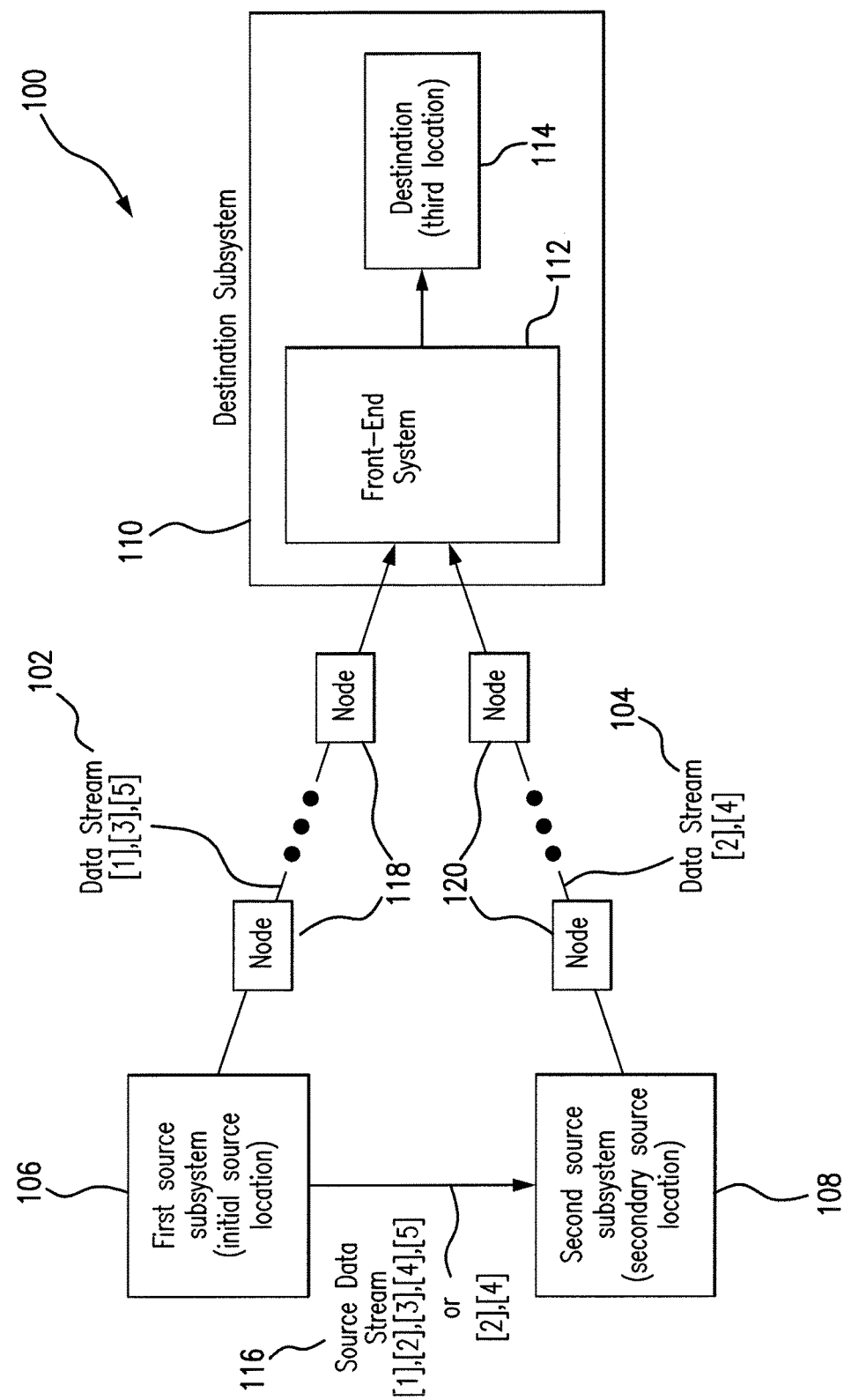
FIG. 2 illustrates an overview of an example data transmission system operating to send data in parallel, according to an example embodiment of the present disclosure.
Figure 3:
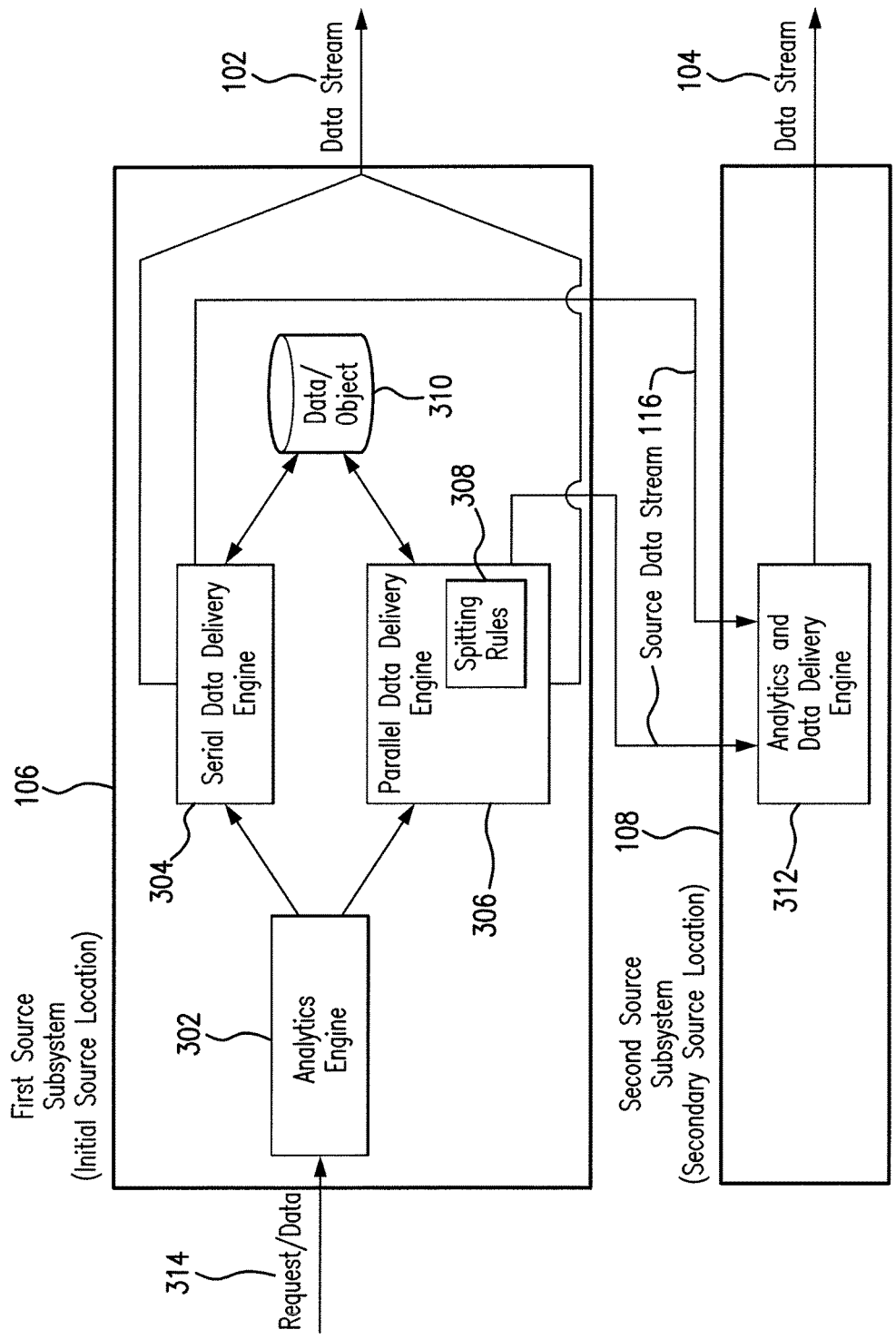
FIG. 3 illustrates a more detailed view of the first source subsystem and the second source subsystem shown in FIGS. 1 and 2, according to an example embodiment of the present disclosure.
Figure 4:
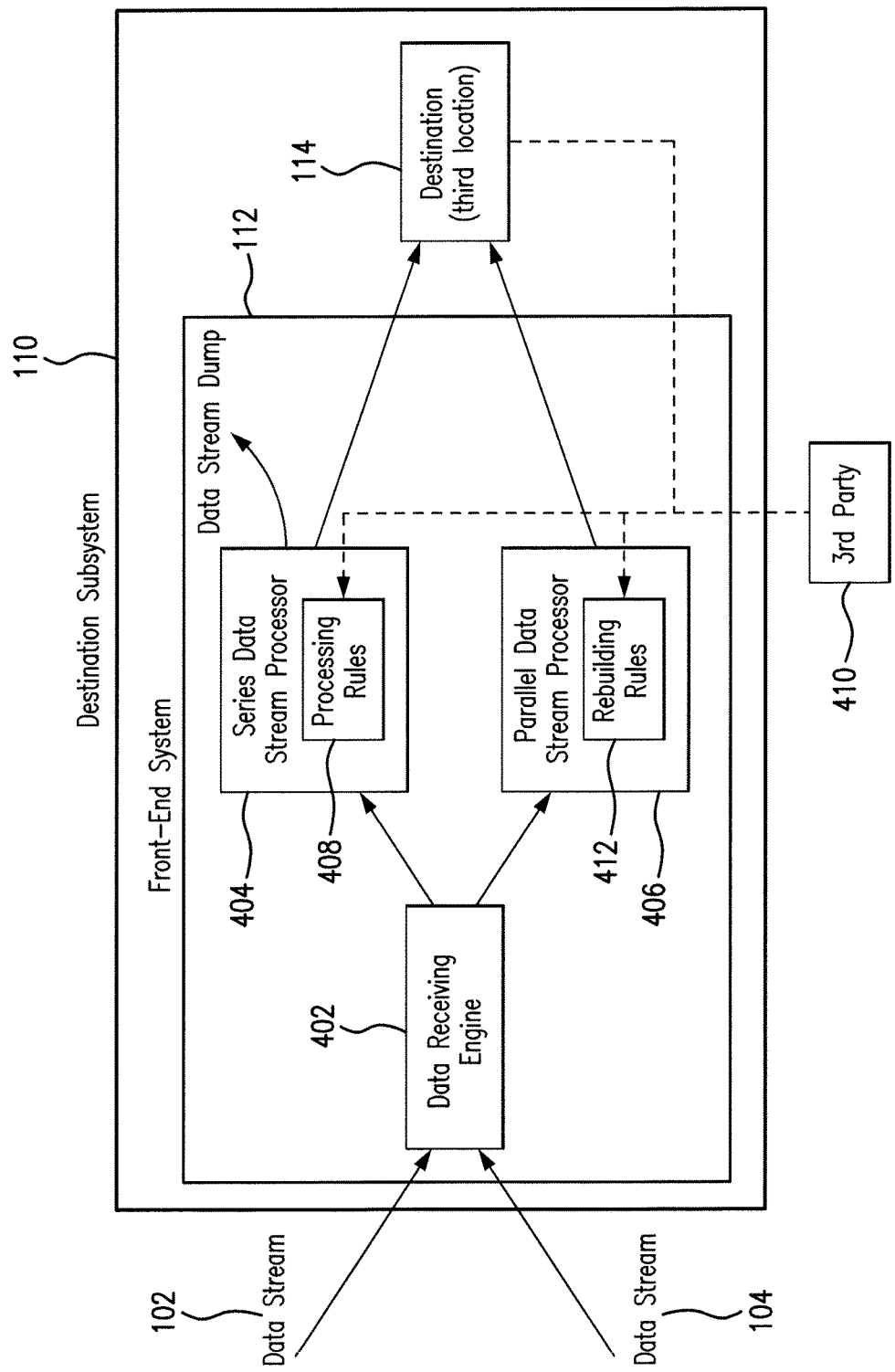
FIG. 4 illustrates a more detailed view of the destination subsystem shown in FIGS. 1 and 2, according to an example embodiment of the present disclosure.
Figure 5:
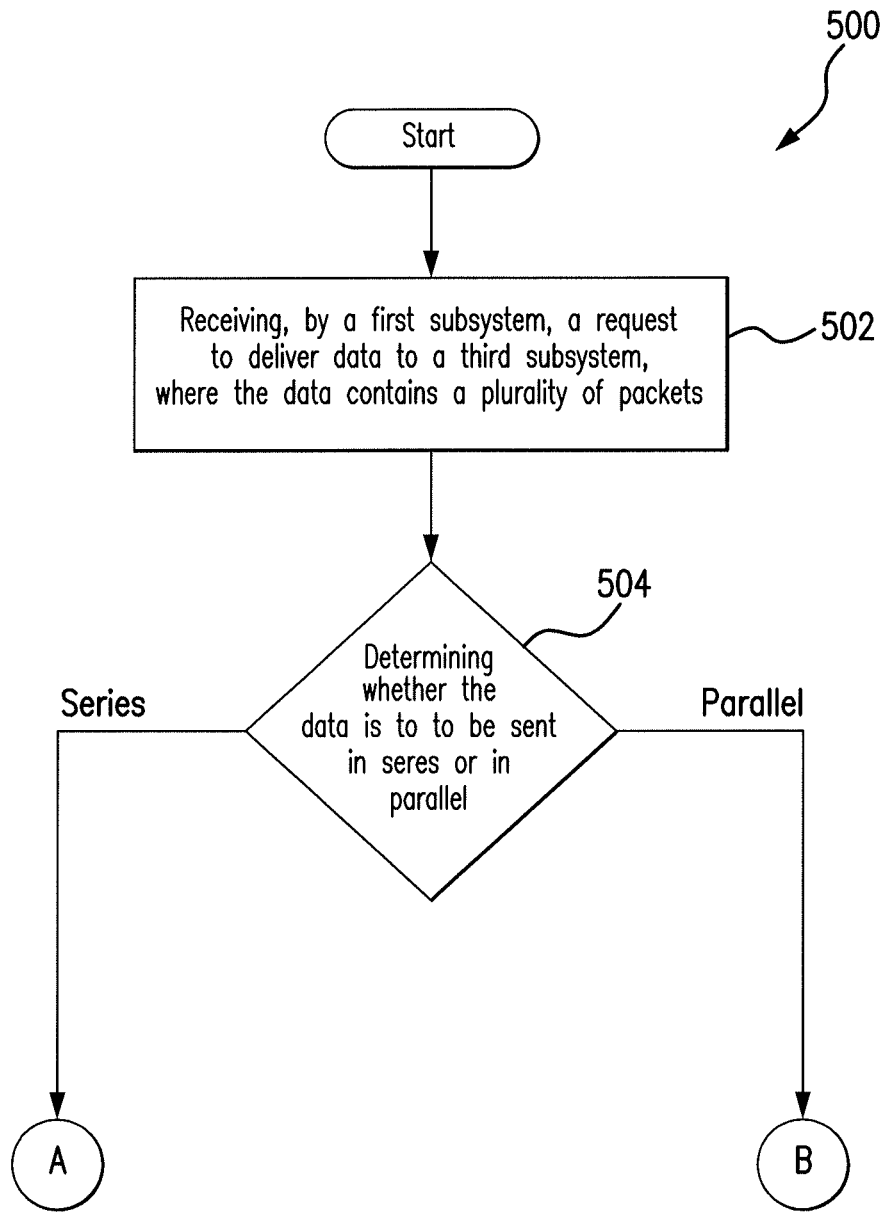
FIG. 5 illustrates a method for carrying out data transmission in series or in parallel, according to example embodiments of the present disclosure.
Figure 5:
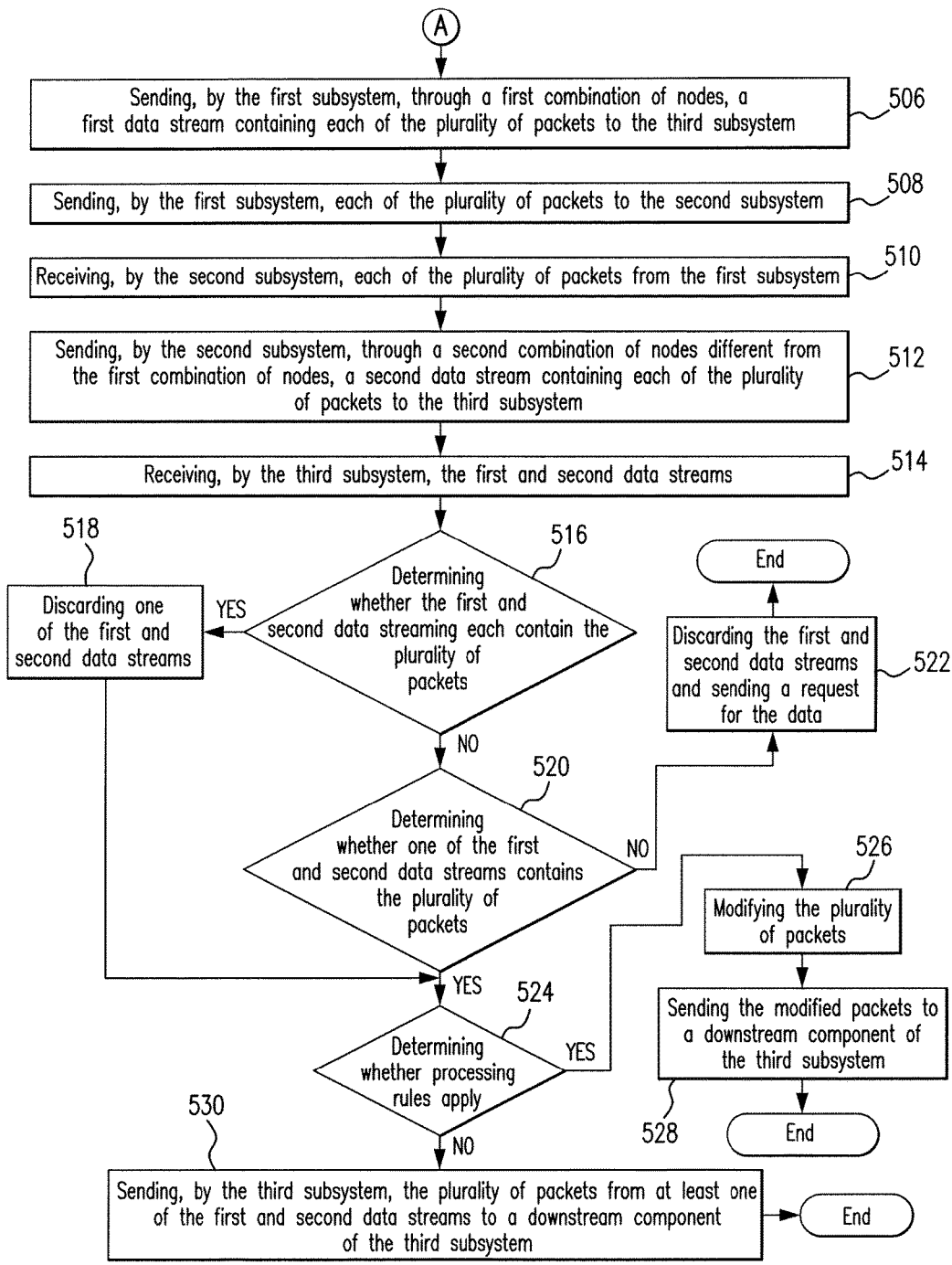
Figure 5:
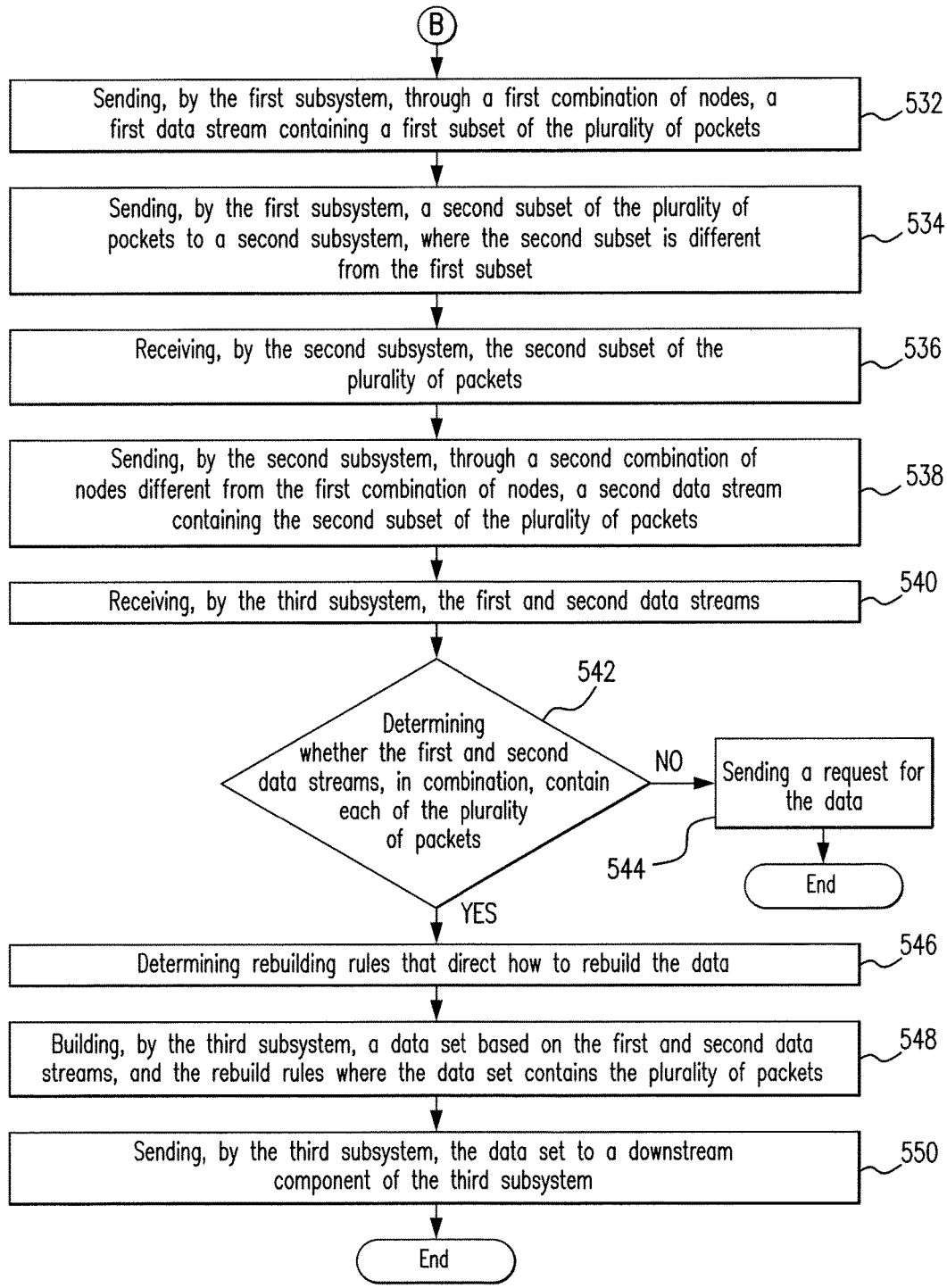

FIG. 1 provides an overview of an example data transmission system operating to send data in series. FIG. 2 provides an overview of an example data transmission system operating to send data in parallel. FIG. 3 provides a more detailed view of an example first and second source subsystems shown in FIGS. 1 and 2. FIG. 4 provides a more detailed view of an example destination subsystem shown in FIGS. 1 and 2, and particularly an example front-end system that receives data streams from the first and second source subsystems of FIGS. 1 and 2. FIG. 5 shows example methods for transmitting data according to certain embodiments of this disclosure.

FIG. 1 illustrates an overview of an example data transmission system 100 operating to send data in series, according to an example embodiment of the present disclosure. In general, FIG. 1 shows two data streams, 102 and 104, containing the same data, being sent from first source subsystem 106 and second source subsystem 108, respectively, to destination subsystem 110. Particularly, front-end system 112 of destination subsystem 110 receives data streams 102 and 104, and in turn processes the data streams and sends some or all of the data streams 102 and/or 104 to destination 114. In addition, FIG. 1 shows first source subsystem 106 sending source data stream 116 to second source subsystem 108, which may occur before second source subsystem 108 sends data stream 104 in certain embodiments. Sending data stream 102 from first source subsystem 106 to destination subsystem 110 may, in particular embodiments, involve data stream 102 being received and sent (hopping) to and from one or more nodes 118, which may belong to one or more networks. Similarly, in some embodiments, sending data stream 104 from second source subsystem 108 to destination subsystem 110 may involve data stream 104 hopping to and from one or more nodes 120, which may belong to one or more networks.

FIG. 1 also shows a particular embodiment where data stream 102, being sent from first source subsystem 106 to destination subsystem 110, includes the same data (shown as packets 1, 2, 3, 4, and 5) as included in data stream 104. Thus, in certain serial delivery embodiments, first source subsystem 106 send a complete copy of packets 1-5, and second source subsystem 108 sends a complete copy of packets 1-5 to destination subsystem 110. Such serial delivery, in certain embodiments, may ensure that time-sensitive or other urgent data is more likely to arrive intact at destination subsystem 110, e.g., destination subsystem 110 is more likely to receive packets 1-5 from one, both, or a combination of data streams 102 and 104. In certain embodiments, first source subsystem 106, second source subsystem 108, destination 114, and front-end system 112 may be in different locations from one another. For example, first source subsystem 106 may be located in Texas, second source subsystem 108 may be located in California, and destination 114 and/or front-end system 112 may be located in New York. In an example embodiment, first source subsystem 106, located in Texas, determines that it needs to send data containing packets 1-5 to destination 114 in New York. First source subsystem 106 may send packets 1-5 to second source subsystem 108 located in California, and then both first source subsystem 106 and second source subsystem 108 send packets 1-5 (as part of data streams 102 and 104) to front-end system 112 of destination subsystem 110, which receives some or all of data streams 102 and 104 and sends data based on data streams 102 and/or 104 to destination 114.

First source subsystem 106 generally is a device or entity from which data stream 102 is sent, even if data stream 102 is sent on behalf of another device or entity (e.g., a third party). In certain embodiments, first source subsystem 106 determines what data of a particular data load to send as part of data stream 102. In addition, in certain embodiments, first source subsystem 106 determines and sends source data stream 116 to second source subsystem 108, where source data stream 116 may be the same or different than data stream 102. First source subsystem 106, in certain embodiments, is a separate physical device from second source subsystem 108 and destination subsystem 110. In some embodiments, first source subsystem 106 is in a different physical location than second source subsystem 108 and destination subsystem 110. First source subsystem 106, in certain embodiments, selects none, some, or all of the nodes 118 that data stream 102 travels through (to and from) to reach destination subsystem 110. First source subsystem 106 may be part of a network and it may be included within another system. As an example, first source subsystem 106 may be a cloud computing entity that seeks (or is requested) to send a large data load to destination subsystem 110, a customer of the cloud computing entity (or another data center of the cloud computing entity, etc.). As another example, first source subsystem 106 may be a network service provider that routes data stream 102 through nodes 118 to destination subsystem 110 for a client—e.g., an entity sending a request for first source subsystem 106 to send a data load containing data stream 102 to destination subsystem 110.

Second source subsystem 108 generally is a device or entity from which data stream 104 is sent, even if data stream 104 is sent on behalf of another device or entity (e.g., first source subsystem 106, a third party, etc.). In certain embodiments, second source subsystem 108 determines what data of a particular data load to send as part of data stream 104. In addition, in certain embodiments, second source subsystem 108 receives source data stream 116 to from first source subsystem 106, where source data stream 116 may be the same or different than data stream 104. In some embodiments, data stream 104 is based on source data stream 116, and may include some or all of source data stream 116. Second source subsystem 108, in certain embodiments, is a separate physical device from first source subsystem 106 and destination subsystem 110. In some embodiments, second source subsystem 108 is in a different physical location (e.g., geographical location) than first source subsystem 106 and destination subsystem 110. Second source subsystem 108, in certain embodiments, selects none, some, or all of the nodes 120 that data stream 104 travels through (to and from) to reach destination subsystem 110. Second source subsystem 108 may be part of a network and it may be included within another system. As an example, second source subsystem 108 may be a cloud computing entity that seeks (or is requested) to send a large data load to destination subsystem 110, a customer of the cloud computing entity (or another data center of the cloud computing entity, etc.). As another example, second source subsystem 108 may be a network service provider that routes data stream 104 through nodes 120 to destination subsystem 110 for a client—e.g., an entity sending a request for second source subsystem 108 to send a data load containing data stream 104 to destination subsystem 110.

Destination subsystem 110 generally is a device or entity to which data streams 102 and 104 are sent. In certain embodiments, destination subsystem 110 contains front-end system 112 and destination 114.

Front-end system 112 generally receives data stream 102 and data stream 104, processes data stream 102 and data stream 104, and sends data to destination 114 based on data streams 102 or 104. In certain embodiments, data stream 102 and/or data stream 104 may not be received or may only be partially received by front-end system 112. In an example embodiment, data stream 102 and data stream 104 are sent to destination 114 and front-end system 112 intercepts and processes data streams 102 and 104, sending some or all of data streams 102 and/or 104 to destination 114, or sending data based on some or all of data streams 102 and/or 104 to destination 114. In another embodiment, data streams 102 and 104 are sent directly to front-end system 112, and may be intended (and include information showing the intent) to be ultimately delivered to destination 114, or front-end system 112 may determine that destination 114 is the proper destination for some or all of the data contained in data streams 102 and 104, or for data based on some or all of data streams 102 and 104 to destination 114.

Destination 114 is generally a destination to which data streams 102, 104, portions thereof, or data based thereon, are sent. Destination 114 may be an ultimate destination for certain data from data streams 104, 104, or data based thereon, or it may be an intermediate destination with additional downstream destinations. Destination 114 may be part of front-end system 112, or vice versa, in certain embodiments, or destination 114 may be a separate device or entity from front-end system 112. In addition, destination 114 may be in a separate physical (e.g., geographical) location from first source subsystem 106, second source subsystem 108, or front-end system 112. Destination 114 may, in some embodiments, send a request to first source subsystem 106 to transmit a data load upon which data streams 102 and/or 104 are based, though in some embodiments another entity or device may send such a request. In certain embodiments, destination 114 is a downstream component of destination subsystem 110.

Data stream 102 is generally data sent from first source subsystem 106 to destination subsystem 110. In particular embodiments, data stream 102 is based on a data load that first source subsystem 106 determines should be sent to destination subsystem 110 or that is identified in a request to first source subsystem 106. Data stream 102 may contain some or all of the data load, or it may contain data based on the data load. Data stream 102 may contain any suitable data of any type, including, e.g., cloud-computing object, such as memory allocations, registry information, etc. (such as information in data 310.

Data stream 104 is generally data sent from second source subsystem 108 to destination subsystem 110. In particular embodiments, data stream 104 is based on source data stream 116 send by first source subsystem 106. In some embodiments, data stream 104 contains data that second source subsystem 108 (or first source subsystem 106) determines should be sent to destination subsystem 110 from second source subsystem 108 or that is identified in a request to first source subsystem 106. Data stream 104 may contain some or all of the data load received or determined by first source subsystem 106, or it may contain data based on the data load. In some embodiments, data stream 104 contains the same information as data stream 102. In other embodiments, data stream 104 contains different information than data stream 102. Data stream 104 may had additional data that data stream 102 does not have, or vice versa. Data stream 104 may have a subset of data in common with data stream 102, and each or both of data streams 102 and 104 may have additional data that the other data stream does not. Data stream 102 may contain any suitable data of any type, including, e.g., cloud-computing objects, such as memory allocations, registry information, etc.

Source data stream 116 is generally data sent from first source subsystem 106 to second source subsystem 108. For example, first source subsystem 106 may determine that another subsystem should send some or all of a data load that first source subsystem 106 has determined to send to destination subsystem 110. In certain embodiments, first source subsystem 106 may send some or all of the data load, or that based on the data load, to second source subsystem 108 as source data stream 116. Source data stream 116 may be any suitable data of any suitable type.

Nodes 118 are any number of any suitable network nodes, particularly nodes through which data stream 102 travels to reach destination subsystem 110. For example, nodes 118 may be servers, computers, terminals, routers, firewalls, gateways, session border controllers, switches, mainframes, laptops, mobile phones, smartphones, any other suitable device that sends and receives data as part of a network, or any combination of the foregoing. Nodes 118 may be a set of nodes that is different from set of nodes 120. Nodes 118 and nodes 120 may share some nodes, share all nodes, or share no nodes between each other. Certain nodes 118 may operate over time with variability, such that they send data relatively quickly at some times, relatively slowly at other times, or not at all on occasion. Some nodes 118 may represent a security risk, e.g., because third parties can view or intercept data passing through such nodes. Some nodes 118 may be overburdened with traffic or otherwise unstable and may drop packets/data from data stream 102 during transit to destination subsystem 110. Nodes 118 may be part of the same network or operated by the same entity, or nodes 118 may be part of different networks or operated by different entities.

Nodes 120 are any number of any suitable network nodes, particularly nodes through which data stream 104 travels to reach destination subsystem 110. For example, nodes 120 may be servers, computers, terminals, routers, firewalls, gateways, session border controllers, switches, mainframes, laptops, mobile phones, smartphones, any other suitable device that sends and receives data as part of a network, or any combination of the foregoing. Nodes 120 may be a set of nodes that is different from set of nodes 118. Nodes 120 and nodes 118 may share some nodes, share all nodes, or share no nodes between each other. Certain nodes 120 may operate over time with variability, such that they send data relatively quickly at some times, relatively slowly at other times, or not at all on occasion. Some nodes 120 may represent a security risk, e.g., because third parties can view or intercept data passing through such nodes. Some nodes 120 may be overburdened with traffic or otherwise unstable and may drop packets/data from data stream 104 during transit to destination subsystem 110. Nodes 120 may be part of the same network or operated by the same entity, or nodes 120 may be part of different networks or operated by different entities, which may or may not be the same networks containing some or all of nodes 118.

First source subsystem 106 and second source subsystem 108 may be contained within a single physical system or distributed in different systems connected via private or public networks, in certain embodiments. In some embodiments, the components of system 100 may each be on the same network. In other embodiments, one or more components of system 100 may be on separate networks and may communicate with each other using any suitable means. Such network(s) may be any local or wide area network that is suitable for use in or with this disclosure, for example: the Internet, a local area network, a private network, a cellular network, etc.

While certain components shown in FIG. 1 in certain configurations, other suitable components, devices, and configurations are contemplated in this disclosure.

FIG. 2 illustrates an overview of an example data transmission system 100 operating to send data in parallel, according to an example embodiment of the present disclosure. In general, FIG. 2 shows two data streams, 102 and 104, containing different sets of data, being sent from first source subsystem 106 and second source subsystem 108, respectively, to destination subsystem 110. The components of system 100 are generally the same as described regarding FIG. 1, though the contents of data streams 102, 104, and 116 may be different in certain parallel data delivery embodiments.

Front-end system 112 of destination subsystem 110 receives data streams 102 and 104, and in turn processes the data streams and sends some or all of the data streams 102 and/or 104 to destination 114. In addition, FIG. 2 shows first source subsystem 106 sending source data stream 116 to second source subsystem 108, which may occur before second source subsystem 108 sends data stream 104 in certain embodiments. Sending data stream 102 from first source subsystem 106 to destination subsystem 110 may, in particular embodiments, involve data stream 102 being received and sent (hopping) to and from one or more nodes 118, which may belong to one or more networks. Similarly, in some embodiments, sending data stream 104 from second source subsystem 108 to destination subsystem 110 may involve data stream 104 hopping to and from one or more nodes 120, which may belong to one or more networks.

FIG. 2 also shows a particular parallel data delivery embodiment where data stream 102, being sent from first source subsystem 106 to destination subsystem 110, includes a different set of data (shown as packets 1, 3, and 5) as compared to the data set included in data stream 104 (shown as packets 2 and 4). Thus, in certain parallel delivery embodiments, first source subsystem 106 sends a portion of the complete copy of packets 1-5, and second source subsystem 108 sends another portion of packets 1-5 to destination subsystem 110. Together, data streams 102 and 104 may be received by front-end system 112 and processed to obtain the complete data set of packets 1-5. In certain embodiments, there may be some overlap of packets between data steam 102 (e.g., packets 1, 3, and 5) and data stream 104 (e.g., packets 2, 3, and 4). Such parallel delivery, in certain embodiments, may ensure that no single node obtains the complete set of data (packets 1-5). In other embodiments, such parallel delivery may make transmission of large data sets faster, as the data can be split between two or more source subsystems and sent to front-end system 112 in parallel. In certain embodiments, first source subsystem 106, second source subsystem 108, destination 114, and front-end system 112 may be in different locations from one another. For example, first source subsystem 106 may be located in Texas, second source subsystem 108 may be located in California, and destination 114 and/or front-end system 112 may be located in New York. In an example embodiment, first source subsystem 106, located in Texas, determines that it needs to send data containing packets 1-5 to destination 114 in New York. First source subsystem 106 may send packets 1-5 (or just packets 2 and 4) to second source subsystem 108 located in California, and then first source subsystem 106 sends packets 1, 3, and 5, as part of data stream 102, to front-end system 112 of destination subsystem 110. Second source subsystem 108 send packets 2 and 4, as part of data stream 104, to front-end system 112 of destination subsystem 110. Front-end system 112, which receives some or all of data streams 102 and 104, and sends data based on data streams 102 and 104 to destination 114. For example, front-end system 112 may reassemble complete data set (packets 1-5) from data streams 102 and 104 and send the complete data set to destination 114.

While certain components shown in FIG. 2 in certain configurations, other suitable components, devices, and configurations are contemplated in this disclosure.

FIG. 3 illustrates a more detailed view of first source subsystem 106 and second source subsystem 108 shown in FIGS. 1 and 2, according to an example embodiment of the present disclosure. First source subsystem 106 may contain analytics engine 302, serial data delivery engine ("SDD engine") 304, parallel data delivery engine ("PDD engine") 306, which may contain splitting rules, and data 310 (which may comprise an object, such as a cloud object) in certain embodiments. Second source subsystem 108 may contain analytics and data delivery engine ("ADD engine") 312.

Analytics engine 302 generally determines whether to send data, and whether to send such data in series or in parallel, in certain embodiments. For example, analytics engine 302 may receive a request 314 or data and determine, based on request 314 or data received, to send data, e.g., to destination subsystem 110 of FIGS. 1 and 2. As another example, analytics engine 302 may determine that a certain data set is to be sent in series, such that a full copy of the data set is sent from first source subsystem 106 to destination subsystem 110, and another full copy of the data set is sent from is sent from second source subsystem 108 to destination subsystem 110. In yet another example, analytics engine 302 may determine that a certain data set is to be sent in parallel, such that a first portion of the data set is sent from first source subsystem 106, and a second portion of the data set is sent from second source subsystem 108, where the first portion of the data set is different from the second portion of the data set. In some embodiments, the first portion of the data set and the second portion of the data set, collectively, contain at least a full copy of the data set. In some embodiments, analytics engine 302 may base its determinations on whether to send data and how to send data based on request 314, data received by analytics engine 302 or first source subsystem 106, or rules (e.g., for particular destinations send requested data in series, at particular times of day, send data in parallel, etc.) determined by analytics engine 302, another component of first source subsystem 106, destination subsystem 110, or a third party. In addition, in certain embodiments, analytics engine 302 may determine, e.g., based on request 314 or any other suitable information, that data 310 is to be sent (e.g., in series or in parallel). In some embodiments, analytics engine 302 sends request 314, received data, or a communication or alert of any suitable kind to serial data delivery engine 304 or parallel data delivery engine, e.g., if analytics engine 302 determines that data is to be sent in series or in parallel.

Serial data delivery engine ("SDD engine") 304 generally sends data as data stream 102 and/or source data stream 116. In particular, SDD engine 304 operates to send data in series. In certain embodiments, SDD engine 304 receives request 314, received data, or a communication or alert of any suitable kind from analytics engine 302, and may determine what data to include in data stream 102 and source data stream 116 based on such information. For example, in certain embodiments, request 314 may request that a particular data load be sent to destination subsystem 110. In some embodiments, SDD engine 304 may determine, independent of request 314, that destination subsystem 110 should be sent a particular data load. Data 310, which may include cloud objects, may be determined to be some or all of a data set sent in data stream 102 or source data stream 116. In some embodiments, SDD engine 304 may send data to data 310, such as data received by analytics engine 302.

SDD engine 304, in certain embodiments, determines that data should be sent in series and the destination to which it should be sent. In other embodiments, SDD engine 304 receives a notification, alert, etc. indicating that data should be sent in series and the destination to which it should be sent. When data is to be sent in series, such as a data set containing packets 1-5 (or blocks, or any suitable unit of data), SDD engine 304 sends data stream 102, containing at least packets 1-5 (a complete copy) to an appropriate destination, such as destination subsystem 110 of FIG. 1 in some embodiments. In particular, SDD engine 304 may send data stream 102 to a front-end system such as front-end system 112 of FIG. 1. In addition, when data is to be sent in series, SDD engine 304 sends source data stream 116, containing at least packets 1-5 (a complete copy) to second source subsystem 108 in some embodiments. In certain embodiments, SDD engine 304 may send an alert or other communication to second source subsystem 108 indicating that a data set including packets 1-5 is to be sent to a destination, and second source subsystem 108 may access such data without SDD engine 304 actually sending the data to second source subsystem 108 as part of source data stream 116.

Parallel data delivery engine ("PDD engine") 306 generally sends data as data stream 102 and/or source data stream 116. In particular, PDD engine 306 operates to send data in parallel. In certain embodiments, PDD engine 306 receives request 314, received data, or a communication or alert of any suitable kind from analytics engine 302, and may determine what data to include in data stream 102 and source data stream 116 based on such information. For example, in certain embodiments, request 314 may request that a particular data load be sent to destination subsystem 110. In some embodiments, PDD engine 306 may determine, independent of request 314, that destination subsystem 110 should be sent a particular data load. Data 310, which may include cloud objects, may be determined to be some or all of a data set sent in data stream 102 or source data stream 116. In some embodiments, PDD engine 306 may send data to data 310, such as data received by analytics engine 302.

PDD engine 306, in certain embodiments, determines that data should be sent in parallel and the destination to which it should be sent. In other embodiments, PDD engine 306 receives a notification, alert, etc. indicating that data should be sent in parallel and the destination to which it should be sent. When data is to be sent in parallel, such as a data set containing packets 1-5 (or blocks, or any suitable unit of data), PDD engine 306 sends data stream 102, containing at least some (a portion or subset) of packets 1-5 (e.g., packets 3, 4, and 5) to an appropriate destination, such as destination subsystem 110 of FIG. 2 in some embodiments. In particular, PDD engine 306 may send data stream 102 to a front-end system such as front-end system 112 of FIG. 2. In addition, when data is to be sent in parallel, PDD engine 306 sends source data stream 116, containing at least some (a portion or subset) of packets 1-5 (e.g., packets 1-2, packets 1-4, packets 1-5, etc.) to second source subsystem 108 in some embodiments. In some embodiments, a full copy of the data set (packets 1-5) can be obtained from a combination of data stream 102 and source data stream 116. In certain embodiments, a full copy of the data set (packets 1-5) can be obtained from a combination of data stream 102 and data stream 104. In particular embodiments, PDD engine 306 may send an alert or other communication to second source subsystem 108 indicating that a data set including packets 1-5 is to be sent to a destination, and second source subsystem 108 may access such data without PDD engine 306 actually sending the data to second source subsystem 108 as part of source data stream 116.

PDD engine 306, in certain embodiments, determines how to divide up a complete set of data (e.g., packets 1-5) based on splitting rules 308. Splitting rules 308 may be any set of rules, conditions, etc. that help PDD engine 306 how to split a data set to be sent in parallel. For example, a rule in splitting rules 308 may indicate that data sets over a certain size are to be split up such that every odd packet is sent as part of data stream 102, and every even packet is sent as part of data stream 104. As another example, a rule of splitting rules 308 may indicate that a particular data set is to be split into a certain number of parts, where a first subset of the parts is to be sent from first source subsystem 106 in data stream 102 and a second subset of the parts is to be sent from second source subsystem 108 in data stream 104. In certain embodiments, the first subset and the second subset, in combination, may include a full copy of the original data set that is being sent. Splitting rules 308 may also include rules for encrypting some or all of a data set being sent by system 100.

Data 310 is any suitable type of data. In certain embodiments, data 310 contains data sets that may be requested to be sent from first source subsystem 106 and second source subsystem 108 (e.g., via request 314). Data 310 may include objects, such as cloud objects. Cloud objects may include object-layer data and resources, and can include registry information, RAM allocation data (and the data itself), hard drive storage allocation data (and the data itself), user preferences and profile information, etc. For example, a request 314 may ask for first source subsystem 106 to send a cloud object containing data registry information or memory resource allocation data from a first location (e.g., located in data 310 and/or first source subsystem 106) to a destination location (a third location) so that the destination location can use or access the cloud object locally. In certain embodiments, data 310 is part of first source subsystem 106. In other embodiments, data 310 is located on another device or is a network resource that first source subsystem 106 can access.

Analytics and data delivery engine ("ADD engine") 312 generally sends data stream 104 to a destination, such as destination subsystem 110 of FIG. 1. ADD engine 312 coordinates the sending of data stream 104 with first source subsystem 106 in some embodiments. In some embodiments, ADD 312 may include two engines, an analytics engine and a data delivery engine, which may be part of the same engine or separate engines. In certain embodiments, ADD engine 312 receives data sets, or subsets of data sets, from first source subsystem 106, e.g., from SDD engine 304 or PDD engine 306. In some embodiments, ADD engine 312 receives instructions (e.g., an alert, or other communication) from first source subsystem 106, e.g., from SDD engine 304 or PDD engine 306. Such instructions may indicate certain data sets or subsets that ADD engine 312 is to send in data stream 104. In some embodiments, ADD 312 engine (or another portion of second source subsystem 108) receives a request (e.g., request 314 or another request) to send certain data in data stream 104. ADD engine can operate in concert with first source subsystem 106 to send a data set in series or in parallel in certain embodiments, and can determine whether to send a data set or subset of a data set in series or in parallel in some embodiments.

For example, when sending data in series, ADD engine 312 may receive a notification from SDD engine 304 indicating that ADD engine 312 is to send a full copy of a certain data set to destination subsystem 110 of FIG. 1. Such a notification may or may not be accompanied by a source data stream 116 containing some or all of the certain data set. In some embodiments, SDD engine 304 sends ADD engine a full copy of the certain data set. In other embodiments, ADD engine 312 accesses the certain data set, which may be stored locally in second source subsystem 108, in another component of system 100 (e.g., data 310), or within a storage resource that is available via a network connection.

When sending data in parallel, ADD engine 312 may receive a notification from PDD engine 306 indicating that ADD engine 312 is to send at least a portion (subset) of a certain data set to destination subsystem 110 of FIG. 2. Such a notification may or may not be accompanied by a source data stream 116 containing some or all of the portion (subset) of the certain data set. In some embodiments, PDD engine 306 sends ADD engine 312 a full copy of the certain data set, and ADD engine 312 determines what subset to send (or responds to instructions from first source subsystem 106 regarding what subset to send). In certain embodiments, PDD engine 306 sends ADD engine 312 a particular subset of the certain data set to send to destination subsystem 110 of FIG. 2. In other embodiments, ADD engine 312 accesses the certain data set, or a subset of the certain data set, which may be stored locally in second source subsystem 108, in another component of system 100 (e.g., data 310), or within a storage resource that is available via a network connection.

Analytics engine 302, SDD engine 304, PDD engine 306, and ADD engine 312, also referred to as "the engines," have, in certain embodiments, the ability to communicate with other components of first source subsystem 106, second source subsystem 108, system 100, and third party devices, either directly or indirectly, e.g., via a network. In some embodiments, the engines receive information from system 100, a third party, or any other suitable source. Such information, in example embodiments, may be from and/or about the information or functionality used or performed by the engines. The engines may use such information, directly or indirectly, to determine data stream 102 and data stream 104. As an additional example, each engine may send information to other engines, other components of system 100, or other systems to effect the desired output (e.g., particular data streams).

In certain embodiments, the engines may contain, use, or share processing resources (e.g., a processor) and memory resources (e.g., a memory). The engines may each have a processor and a memory, or one or more processors or memory may be shared among some or all of the engines. In certain embodiments, processor resources or memory resources are provided via a cloud service. In example embodiments, a processor used by one or more of the engines (which may be more than one processor in one or more components) is any electronic circuitry, including, but not limited to microprocessors, application specific integrated circuits (ASIC), application specific instruction set processor (ASIP), and/or state machines, that communicatively couples to a memory and controls the operation of data transmission controller 102, or components thereof. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of first source subsystem 106, second source subsystem 108, or components thereof, by processing information received from, e.g., a user, request 314 (which may contain data), destination subsystem 110, a third party, or any component of system 100. The processor may be a programmable logic device, a microcontroller, a microprocessor, any suitable processing device, or any suitable combination of the preceding. The processor is not limited to a single processing device and may encompass multiple processing devices.

In example embodiments, a memory used by one or more of the engines (which may be more than one memory in one or more components and may, in some embodiments, include data 310 or portions thereof) may store, either permanently or temporarily, data, operational software, or other information for one or more processors used by one or more of the engines ("the processor"). The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

Components of first source subsystem 106 and second source subsystem 108 may be contained within a single physical system or distributed in different systems in different locations connected via private or public networks, in certain embodiments. In some embodiments, the components of system 100 may each be on the same network or any other suitable network. In other embodiments, one or more components of system 100 may be on separate networks and may communicate with each other using any suitable means. Such network(s) may be any local or wide area network that is suitable for use in or with this disclosure, for example: the Internet, a local area network, a private network, a cellular network, etc.

While certain components of certain devices are shown in FIG. 3 in certain configurations, other suitable components, devices, and configurations are contemplated in this disclosure.

FIG. 4 illustrates a more detailed view of destination subsystem 110 shown in FIGS. 1 and 2, according to an example embodiment of the present disclosure. Destination subsystem 110 may contain front-end system 112, which may include data receiving engine 402, series data stream processor ("SDSP") 404, and parallel data stream processor ("PDSP") 406. Furthermore, destination subsystem 110 may contain destination 114.

Data receiving engine 402 generally receives data streams. For example, data receiving engine 402 may receive data stream 102 from first source subsystem 106 and data stream 104 from second source subsystem 108. In certain embodiments, data receiving engine 402 determines whether received data streams are part of a transmission of a data set in series or part of a transmission of a data set in parallel.

For example, data receiving engine 402 may receive data stream 102 and data stream 104, determine that a full copy of a data set (e.g., packets 1-5) is present in each data stream, and based on these data streams, determine that the data set containing packets 1-5 are part of a transmission in series. In some embodiments, data stream 102 and/or data stream 104 may include information identifying the data stream(s) as in-series transmissions. In instances where data receiving engine 402 determines that a received data set is part of an in-series transmission, data receiving engine 402 may send some or all of such received data sets to SDSP 404.

In another example, data receiving engine 402 may receive data stream 102 and data stream, determine that a full copy of a data set (e.g., packets 1-5) is present in a combination of each data stream (but not, e.g., in each data stream independently), and based on these data streams, determine that the data set containing packets 1-5 are part of a transmission in parallel. In some embodiments, data stream 102 and/or data stream 104 may include information identifying the data stream(s) as in-parallel transmissions. In instances where data receiving engine 402 determines that a received data set is part of an in-parallel transmission, data receiving engine 402 may send some or all of such received data sets to PDSP 406.

Data receiving engine 402, in certain embodiments, sends data streams (e.g., data streams 102 and 104) to SDSP 404 or PDSP 406 without determining whether the data streams are part of in-series or in-parallel transmissions. For example, SDSP 404 and PDSP 406 may determine whether the data streams are part of in-series or in-parallel transmissions, and SDPS 404 and PDSP may be linked or part of the same data stream processor such that the data stream processor can receive, identify, and process either serial or parallel data streams.

SDSP 404 generally receives some or all of data streams (e.g., 102 and 104), determines that certain data streams were sent as an in-series transmission, processes the data streams, and sends data based on the data streams to destination 114. In certain embodiments, SDSP 404 receives some or all of data streams 102 and 104 from data receiving engine and determines that the data streams are part of an in-series transmission, e.g. as described with respect to data receiving engine 402. In certain embodiments SDSP 404 identifies data streams 102 and 104 as part of an in-series transmission, e.g., compares data sets within data streams 102 and 104 to confirm or determine that two full copies of the data set are present. In some embodiments, SDSP 404 may receive only one data stream (e.g., 102) and not another of its in-series transmission counterpart (e.g. 104) or it may receive only portions of one or more data streams of an in-series transmission. In such circumstances, SDSP 404 may still determine that the one or more data streams are part of an in-series transmission, e.g., because information identifying the data streams as in-series transmissions was included within data streams 102 and/or 104. SDSP 404 may, in some embodiments, identify a full data set regardless of whether the one or more data streams comprising the full data set are identified as an in-series or an in-parallel transmission.

In certain instances where SDSP 404 receives multiple data streams (e.g. data streams 102 and 104), each containing a full copy of a data set, SDSP 404 may discard one of the data streams and send data based on only one received data set to destination 114. In some instances, SDSP 404 may receive a full copy and an incomplete copy of a data set (e.g., the incomplete copy lost some data at a faulty node) and discard the incomplete copy and send data based on the full set to destination 114.

SDSP 404, in some embodiments, may process one or more received data streams based on processing rules 408. Processing rules 408 generally provide rules or conditions directing how SDSP 404 is to process certain data streams. For example, processing rules 408 may include a rule saying that for a data set containing packets 1-5, packet 1 should be dropped and only packets 2-5 should be sent to destination 114. As another example, processing rules 408 may include a rule saying that some or all of a data set should be decrypted, encrypted, or scanned for viruses or malware before being sent to destination 114. Processing rules 408 may also include rules for assembling partial datasets from two or more data streams sent as in-series transmissions, but where portions of the sent data sets were lost or corrupted during transmission. Processing rules 408 may be generated by any suitable source, such as a sender of request 314 of FIG. 3, destination 114, a user of system 100 of FIGS. 1 and 2, or a third party 410. For example, a third party entity 410 associated with system 100 may inform SDSP 404 of processing rules to process data sets in received data streams.

PDSP 406 generally receives some or all of data streams (e.g., 102 and 104), determines that certain data streams were sent as an in-parallel transmission, processes the data streams, and sends data based on the data streams to destination 114. In certain embodiments, PDSP 406 receives some or all of data streams 102 and 104 from data receiving engine and determines that the data streams are part of an in-parallel transmission, e.g. as described with respect to data receiving engine 402. In certain embodiments PDSP 406 identifies data streams 102 and 104 as part of an in-parallel transmission, e.g., compares data sets within data streams 102 and 104 to confirm or determine that each contains a different portion (subset) of a particular data set. In some embodiments, PDSP 406 may receive only one data stream (e.g., 102) and not another of its in-series transmission counterpart (e.g. 104) or it may receive only portions of one or more data streams of an in-series transmission. In such circumstances, PDSP 406 may still determine that the one or more data streams are part of an in-parallel transmission, e.g., because information identifying the data streams as in-parallel transmissions was included within data streams 102 and/or 104. PDSP 406 may, in some embodiments, identify a full data set regardless of whether the one or more data streams comprising the full data set are identified as an in-series or an in-parallel transmission. In certain embodiments, PDSP 406 assembles a full data set, or a portion of a full data set based on data stream 102 and data stream 104 that are sent as part of an in-parallel transmission. For example, if data stream 102 contains packets 3-5 and data stream 104 contains packets 1-3, PDSP 406 may take some or all data from each data stream to assemble a full data set (packets 1-5). PDSP 406 may send some or all of a full data set (e.g., packets 1-5), or it may send data based on data streams 102 or 104. In some embodiments, PDSP 406 may be configured to discard at least some packets from one of data stream 102 and data stream 104, wherein the at least some packet are packets that are common to both data stream 102 and data stream 104.

PDSP 406, in some embodiments, may process one or more received data streams based on rebuilding rules 412. Rebuilding rules 412 generally provide rules or conditions directing how PDSP 406 is to process certain data streams, e.g., how to rebuild data subsets in different parallel data streams into full data sets. Rebuilding rules 412 may also include rules for assembling partial datasets (subsets) from two or more data streams sent as in-series transmissions, but where portions of the sent data sets were lost or corrupted during transmission. In some embodiments, rebuilding rules 412 are based on splitting rules 308 of FIG. 3, or vice versa. In other embodiments, rebuilding rules 412 are determined independently from splitting rules 308. In certain embodiments, rebuilding rules 412 mirror splitting rules 308 such that the act of splitting a data set can be reversed and rebuilt in PDSP 406. In an example embodiment, rebuilding rules 412 may include a rule saying that for a data set containing packets 1-5, packet 1 should be dropped and only packets 2-5 should be sent to destination 114. As another example, rebuilding rules 412 may include a rule saying that some or all of a data set should be decrypted, encrypted, or scanned for viruses or malware before being sent to destination 114. Rebuilding rules 412 may be generated by any suitable source, such as a sender of request 314 of FIG. 3, destination 114, a user of system 100 of FIGS. 1 and 2, or a third party 410. For example, a third party entity 410 associated with system 100 may inform PDSP 406 of rebuilding rules to rebuild or otherwise process data sets in received data streams. In some embodiments, system 100 updates splitting rules 308 of FIG. 3 and rebuilding rules 412 independently or in coordination, such that splitting rules 308 and rebuilding rules 412 complement each other and allow for the suitable splitting and rebuilding of data sets. In addition, splitting rules 308 and/or rebuilding rules 412 may be based on request 314 of FIG. 3.

Data receiving engine 402, SDSP 404, and PDSP 406, also referred to as "the front-end engines," have, in certain embodiments, the ability to communicate with other components of destination subsystem 110, front-end system 112, system 100, and third party devices, either directly or indirectly, e.g., via a network. In some embodiments, the front-end engines receive information from system 100, a third party, or any other suitable source. Such information, in example embodiments, may be from and/or about the information or functionality used or performed by the front-end engines. The front-end engines may use such information, directly or indirectly, to determine data to send to destination 114. As an additional example, each engine may send information to other engines, other components of system 100, or other systems to effect the desired output (e.g., particular downstream data outputs to destination 114 and beyond).

In certain embodiments, the front-end engines may contain, use, or share processing resources (e.g., a processor) and memory resources (e.g., a memory). The front-end engines may each have a processor and a memory, or one or more processors or memory may be shared among some or all of the engines. In certain embodiments, processor resources or memory resources are provided via a cloud service. In example embodiments, a processor used by one or more of the front-end engines (which may be more than one processor in one or more components) is any electronic circuitry, including, but not limited to microprocessors, application specific integrated circuits (ASIC), application specific instruction set processor (ASIP), and/or state machines, that communicatively couples to a memory and controls the operation of data transmission controller 102, or components thereof. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of first source subsystem 106, second source subsystem 108, or components thereof, by processing information received from, e.g., a user, request 314 (which may contain data), destination subsystem 110, a third party, or any component of system 100. The processor may be a programmable logic device, a microcontroller, a microprocessor, any suitable processing device, or any suitable combination of the preceding. The processor is not limited to a single processing device and may encompass multiple processing devices.

In example embodiments, a memory used by one or more of the front-end engines (which may be more than one memory in one or more components and may, in some embodiments, include data 310 or portions thereof) may store, either permanently or temporarily, data, operational software, or other information for one or more processors used by one or more of the front-end engines ("the processor"). The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

Components of destination subsystem 110 may be contained within a single physical system or distributed in different systems in different locations connected via private or public networks, in certain embodiments. In some embodiments, the components of system 100 may each be on the same network or any other suitable network. In other embodiments, one or more components of system 100 may be on separate networks and may communicate with each other using any suitable means. Such network(s) may be any local or wide area network that is suitable for use in or with this disclosure, for example: the Internet, a local area network, a private network, a cellular network, etc.

While certain components of certain devices are shown in FIG. 4 in certain configurations, other suitable components, devices, and configurations are contemplated in this disclosure.

FIG. 5 illustrates a method 500 for carrying out data transmission in series or in parallel, according to example embodiments of the present disclosure. Method 500 contains steps 502-550.

Step 502 includes receiving, by a first subsystem, a request to deliver data to a third subsystem, where the data contains a plurality of packets. For example, the first subsystem may be first source subsystem 106, and the request may be request 314.

Step 504 includes determining whether the data is to be sent in series or in parallel. For example, data may be sent as described with regard to FIG. 1 (e.g., in series) or as described with regard to FIG. 2 (e.g., in parallel), or as described with regard to FIG. 3 (either in series or in parallel). In certain embodiments, step 504 includes determining, by a first subsystem, that the data is to be sent in series, such that each of the plurality of packets is to be sent from both the first subsystem and a second subsystem. In some embodiments, step 504 includes determining, by a first subsystem, that the data is to be sent in parallel, such that a first subset of the plurality of packets is to be sent from a second subsystem and a second subset of the plurality of packets is to be sent from the first subsystem (or vice versa). If it is determined that the data is to be sent in series, method 500 follows path "A" and continues to step 506. If it is determined that the data is to be sent in parallel, method 500 follows path "B" and continues to step 532.

Step 506 includes sending, by the first subsystem, through a first combination of nodes, a first data stream containing each of the plurality of packets to the third subsystem. For example, first source subsystem 106 of FIG. 1 may send data stream 102 containing the plurality of packets (a first copy) to destination subsystem 110. As another example, the first combination of nodes may be nodes 118.

Step 508 includes sending, by the first subsystem, each of the plurality of packets to the second subsystem. For example, first source subsystem 106 may sent the plurality of packets to second source subsystem 108 as part of source data stream 116.

Step 510 includes receiving, by the second subsystem, each of the plurality of packets from the first subsystem.

Step 512 includes sending, by the second subsystem, through a second combination of nodes different from the first combination of nodes, a second data stream containing each of the plurality of packets to the third subsystem. For example, second source subsystem 108 may send data stream 104 containing the plurality of packets (a second copy) to destination subsystem 110. As another example, the second combination of nodes may be nodes 120.

Step 514 includes receiving, by the third subsystem (e.g., destination subsystem 110), the first and second data streams.

Step 516 includes determining whether the first and second data streams each contain the plurality of packets. In some embodiments, step 516 includes determining whether, upon receipt, the first data stream included a full copy of the data and whether the second data stream included a full copy of the data. If the first and second data streams each contain the plurality of packets, method 500 continues to step 518. If not, method 500 continues to step 520.

Step 518 includes discarding one of the first and second data streams. For example, if front-end system 112 received a full copy of the data from data stream 102 and a full copy of the data from data stream 104, front-end system 112 may drop, delete, dump, or otherwise discard one of the data streams, e.g., data stream 104.

Step 520 includes determining whether one of the first and second data streams contains the plurality of packets. For example, certain packets could have been lost by both data streams during transmission, in which case neither contains a full set of the plurality of packets. If neither the first nor the second data streams contain the plurality of packets, method 500 proceeds to step 522. Otherwise, if either the first or the second data stream contains the plurality of packets, method 500 continues to step 524.

Step 522 includes discarding the first and second data streams and sending a request for the data to be resent. In certain embodiments, a request may be sent by destination subsystem 110 seeking either retransmission of the entire data set being sent, or merely of the missing packets. In some embodiments, destination subsystem 110 may receive the missing packets and reassemble the full data set (the plurality of packets). In some embodiments, destination subsystem 110 may identify the plurality of packets scattered between the first and second data streams such that the combination of the first and second data streams includes the plurality of packets. In such embodiments, destination subsystem 110 may rebuild the plurality of packets into a single data set, for example by using rebuilding rules 412. In some embodiments, method 500 may continue to step 524.

Step 524 includes determining whether processing rules apply to the data received by the third subsystem (the plurality of packets). For example, processing rules from destination 114 may indicate that the data be processed according to the processing rules. If processing rules apply, method 500 continues to step 526. If not, method 500 continues to step 530.

Step 526 includes modifying the plurality of packets, e.g., based on the processing rules. For example, if the processing rules indicate that the plurality of packets should be encrypted, or that certain packets be dropped, then, e.g., front-end system 112 may modify the plurality of packets according to the processing rules.

Step 528 includes sending, by the third subsystem, the modified packets to a downstream component of the third subsystem. For example, front-end system 112 may send the plurality of packets, as modified in step 526, to a downstream component of the third subsystem, such as destination 114 or another downstream device or component.

Step 530 includes sending, by the third subsystem, the plurality of packets from at least one of the first and second data streams to a downstream component of the third subsystem. For example, front-end system 112 may send the plurality of packets to a downstream component of the third subsystem, such as destination 114 or another downstream device or component.

Step 532 includes sending, by the first subsystem, through a first combination of nodes, a first data stream containing a first subset of the plurality of packets to the third subsystem. For example, the plurality of packets may include packets 1-5. First source subsystem 106 may send a subset of the plurality of packets (e.g., packets 3 and 4) through nodes 118 to destination subsystem 110 as part of data stream 102.

Step 534 includes sending, by the first subsystem, a second subset of the plurality of packets to a second subsystem, where the second subset is different from the first subset. For example, first source subsystem 106 may send packets 1, 2, and 5 as part of source data stream 116 to second source subsystem 108.

Step 536 includes receiving, by the second subsystem, the second subset of the plurality of packets.

Step 538 includes sending, by the second subsystem, through a second combination of nodes different from the first combination of nodes, a second data stream containing the second subset of the plurality of packets. For example, second source subsystem 108 may send data stream 104 containing the second subset of packets to destination subsystem 110 via nodes 120, where the set of nodes 120 is not the same as the set of nodes 118.

Step 540 includes receiving, by the third subsystem, the first and second data streams.

Step 542 includes determining whether the first and second data streams, in combination, contain each of the plurality of packets. For example, step 542 includes determining that a full copy of the data (e.g., packets 1-5) is present in some combination of data streams 102 and 104. If a combination of the first and second data streams do not contain each of the plurality of packets, method 500 proceeds to step 544. Otherwise, method 500 proceeds to step 546.

Step 544 includes sending a request for the data. For example, if a full copy of the plurality of packets did not arrive in data sets 102 and 104 (e.g., only packet 1, 3, 4, and 5 arrived), third subsystem (e.g., destination subsystem 110) may send a request that the plurality of packets be resent, or that just the missing packet(s) be resent. In certain embodiments, the third subsystem may receive the missing packets and reassemble the data containing the plurality of packets (e.g., based on rebuilding rules 412). In such instances, method 500 may continue to step 546.

Step 546 includes determining rebuilding rules that direct how to rebuild the data. For example, rebuilding rules may be rebuilding rules 412, and may include instructions to rebuild data that was previously split in order to send the data in parallel (e.g., split by PDD engine 306 based on splitting rules 308). In certain embodiments, rebuilding rules, such as rebuilding rules 412, may be determined by front-end system 112 based on one or more of the first and second data streams or delivered to front-end system 112 from other components of system 100 or a third party 410. In certain embodiments, such rebuilding rules may contain processing rules 408 or rules similar to the types of rules included in processing rules 408.

Step 548 includes building, by the third subsystem, a data set based on the first and second data streams, where the data set contains the plurality of packets. For example, rebuilding rules may include instructions to identify that subsets containing different packets (including packets 1-5 in combination) have packets 1-5 and that the order of packets 1-5 is 1, then 2, then 3, then 4, then 5. In addition, certain embodiments may include rebuilding rules that discard certain packets, such as packets that are common between two different subsets (e.g., one contains packets 1-3 and another contains packets 3-5, and thus packet 3 is discarded from one of the subsets). Rebuilding rules may also contain rules regarding encryption, decryption, etc.

Step 550 includes sending, by the third subsystem, the data set to a downstream component of the third subsystem. For example, front-end system 112 may sent the data set containing the plurality of packets to destination 114 or another downstream component, whether a part of the third subsystem or not.

Although this disclosure describes and illustrates particular steps of the method 500 of FIG. 5 as occurring in a particular order, this disclosure contemplates any steps of the method of FIG. 5 occurring in any order. An embodiment can repeat or omit one or more steps of the method of FIG. 5.

Moreover, although this disclosure describes and illustrates particular components carrying out particular steps of the method of FIG. 5, this disclosure contemplates any combination of any components carrying out any steps of the method of FIG. 5.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or."

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system, comprising:
a first subsystem located in a first location, a second subsystem located in a second location, and a third subsystem located in a third location, wherein the first, second, and third locations correspond to different geographical locations and wherein:
the first subsystem comprises a first analytics engine and a first delivery engine, the first analytics engine configured to:
receive a request to deliver data to the third subsystem, the data comprising a plurality of packets;
determine whether to deliver the data via transmission in series or transmission in parallel, based on a time of day and the third location of the third subsystem, wherein transmission in series comprises sending the plurality of packets along a single transmission path and transmission in parallel comprises sending subsets of the plurality of packets along different transmission paths; and
responsive to a determination to deliver the data via transmission in parallel, inform the first delivery engine of the request and the determination to deliver the data via transmission in parallel;
the first delivery engine configured to:
determine a first subset of the plurality of packets and a second subset of the plurality of packets to transmit in parallel, wherein the second subset of the plurality of packets is different from the first subset of the plurality of packets;
send the first subset of the plurality of packets to the second subsystem; and
send, through a first combination of nodes, a first data stream to the third subsystem, the first data stream comprising the second subset of the plurality of packets and first information identifying the first data stream as part of a parallel transmission;
the second subsystem comprises a second analytics engine and a second delivery engine, the second analytics engine configured to:
receive the first subset of the plurality of packets from the first subsystem; and
inform the second delivery engine to deliver the first subset of the plurality of packets to the third subsystem;
the second delivery engine configured to:
send, through a second combination of nodes that differ from the first combination of nodes, a second data stream to the third subsystem, the second data stream comprising the first subset of the plurality of packets and second information identifying the second data stream as part of the parallel transmission;
the third subsystem comprising a data stream processor, the data stream processor configured to:
receive the first and second data streams;
determine, based on the first and second information, that the first and second data streams are part of the parallel transmission;
responsive to determining that the first and second data streams are part of the parallel transmission, determine that the first and second data streams, in combination, comprise each of the plurality of packets;
responsive to determining that the first and second data streams, in combination, comprise each of the plurality of packets, build a data set based on the first and second data streams, wherein the data set comprises the plurality of packets; and
send the data set to a downstream component of the third subsystem.

2. The system of claim 1, wherein the data comprises a cloud object.

3. The system of claim 1, wherein the data stream processor is further configured to discard at least some packets from one of the first data stream and the second data stream, wherein the at least some packet are packets that are common to both the first data stream and the second data stream.

4. The system of claim 1, wherein the data stream processor is further configured to build the data set based on one or more rebuilding rules.

5. The system of claim 4, wherein the one or more rebuilding rules are received by the data stream processor from the downstream component of the third subsystem.

6. The system of claim 4, wherein the one or more rebuilding rules are received by the data stream processor from an entity that is different from any entity operating at least one of the first subsystem, the second subsystem, and the third subsystem.

7. A front-end system, comprising:
a data receiving engine configured to:
receive, from a first subsystem, a first data stream sent to a third subsystem, wherein the first data stream comprises a first subset of data comprising a plurality of packets and first information identifying the first data stream as part of a parallel transmission, wherein the first subsystem is configured to determine whether to deliver the data via transmission in series or transmission in parallel, based on a time of day and a location of the third subsystem, wherein transmission in series comprises sending the plurality of packets along a single transmission path and transmission in parallel comprises sending subsets of the plurality of packets along different transmission paths;

receive, from a second subsystem that is in a different geographical location than the first subsystem, a second data stream sent to the third subsystem, wherein the second data stream comprises a second subset of the data and second information identifying the second data stream as part of the parallel transmission, wherein the second subset of the data is different from the first subset of the data; and send the first and second data streams to a data stream processor; and the data stream processor configured to:

receive the first and second data streams;

determine, based on the first and second information, that the first and second data streams are part of the parallel transmission;

responsive to determining that the first and second data streams are part of the parallel transmission, determine that the first and second data streams, in combination, comprise each of the plurality of packets;

responsive to determining that the first and second data streams, in combination, comprise each of the plurality of packets, build a data set based on the first and second data streams, wherein the data set comprises the plurality of packets; and send the data set to a downstream component of the third subsystem.

8. The system of claim 7, wherein the data comprises a cloud object.

9. The system of claim 7, wherein the data stream processor is further configured to discard at least some packets from one of the first data stream and the second data stream.

10. The system of claim 7, wherein the data stream processor is further configured to build the data set based on one or more rebuilding rules.

11. The system of claim 10, wherein the one or more rebuilding rules are received by the data stream processor from the downstream component of the third subsystem.

12. The system of claim 10, wherein the one or more rebuilding rules are received by the data stream processor from an entity that is different from any entity operating at least one of the first subsystem, the second subsystem, and the third subsystem.

13. A method, comprising:

receiving, by a first subsystem, a request to deliver data to a third subsystem, the data comprising a plurality of packets;

determining, by the first subsystem, whether to deliver the data via transmission in series or transmission in parallel, based on a time of day and the third location of the third subsystem, wherein transmission in series comprises sending the plurality of packets along a single transmission path and transmission in parallel comprises sending subsets of the plurality of packets along different transmission paths;

sending, by the first subsystem, a first subset of the plurality of packets to a second sub system;

sending, by the first subsystem, through a first combination of nodes, a first data stream to the third subsystem, the first data stream comprising a second subset of the plurality of packets and first information identifying the first data stream as part of a parallel transmission, wherein the second subset of the plurality of packets is different from the first subset of the plurality of packets;

receiving, by the second subsystem, the first subset of the plurality of packets from the first subsystem;

sending, by the second subsystem, through a second combination of nodes that differ from the first combination of nodes, a second data stream to the third subsystem, the second data stream comprising the first subset of the plurality of packets and second information identifying the second data stream as part of the parallel transmission;

receiving, by the third subsystem, the first and second data streams;

determining, based on the first and second information, that the first and second data streams are part of the parallel transmission;

responsive to determining that the first and second data streams are part of the parallel transmission, determining, by the third subsystem, that the first and second data streams, in combination, comprise each of the plurality of packets;

responsive to determining that the first and second data streams, in combination, comprise each of the plurality of packets, building, by the third subsystem, a data set based on the first and second data streams, wherein the data set comprises the plurality of packets; and sending, by the third subsystem, the data set to a downstream component of the third sub system;

wherein the first subsystem is located in a first location, the second subsystem located in a second location, and the third subsystem located in a third location, wherein the first, second, and third locations correspond to different geographical locations.

14. The method of claim 13, wherein the data comprises a cloud object.

15. The method of claim 13, further comprising discarding, by the third subsystem, at least some packets from one of the first data stream and the second data stream, wherein the at least some packet are packets that are common to both the first data stream and the second data stream.

16. The method of claim 13, further comprising building the data set based on one or more rebuilding rules.

17. The method of claim 16, wherein the one or more rebuilding rules are received by the data stream processor from the downstream component of the third subsystem.

18. The method of claim 16, wherein the one or more rebuilding rules are received by the data stream processor from an entity that is different from any entity operating at least one of the first subsystem, the second subsystem, and the third subsystem.

* * * * *